United States Patent
Huang

(10) Patent No.: US 8,539,133 B2
(45) Date of Patent: Sep. 17, 2013

(54) EMBEDDED SYSTEM CAPABLE OF DECREASING INTERRUPT FREQUENCY OF ARM PROCESSOR THEREOF

(75) Inventor: Ren-Wen Huang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 147 days.

(21) Appl. No.: 13/189,581

(22) Filed: Jul. 25, 2011

(65) Prior Publication Data

US 2012/0278521 A1 Nov. 1, 2012

(30) Foreign Application Priority Data

Apr. 29, 2011 (CN) .......................... 2011 1 0110575

(51) Int. Cl.
*G06F 13/38* (2006.01)
*G06F 13/40* (2006.01)

(52) U.S. Cl.
CPC .................................. *G06F 13/4018* (2013.01)
USPC ................................. 710/307; 710/66; 710/70

(58) Field of Classification Search
USPC ............................................................ 710/307
See application file for complete search history.

(56) References Cited

U.S. PATENT DOCUMENTS

| | | | | |
|---|---|---|---|---|
| 5,608,882 A * | 3/1997 | Abert et al. | ................... | 710/307 |
| 5,734,843 A * | 3/1998 | Gephardt et al. | ............. | 710/107 |
| 5,771,358 A * | 6/1998 | LaBerge | ........................ | 710/107 |
| 5,901,332 A * | 5/1999 | Gephardt et al. | ............... | 710/41 |
| 5,974,493 A * | 10/1999 | Okumura et al. | ............. | 710/307 |
| 6,889,275 B2 * | 5/2005 | Vandecappelle et al. | ...... | 710/107 |
| 7,010,632 B2 * | 3/2006 | Floman | ......................... | 710/104 |
| 7,085,875 B1 * | 8/2006 | Yona et al. | ..................... | 710/307 |
| 7,334,061 B2 * | 2/2008 | Raju et al. | ........................ | 710/35 |
| 7,543,088 B2 * | 6/2009 | Weber et al. | ..................... | 710/35 |
| 7,606,956 B2 * | 10/2009 | Deshpande et al. | .......... | 710/110 |
| 7,640,383 B2 * | 12/2009 | Tseng | ............................ | 710/104 |
| 2006/0112210 A1 * | 5/2006 | Tseng | ............................ | 710/307 |
| 2008/0189458 A1 * | 8/2008 | Deshpande et al. | .......... | 710/110 |

* cited by examiner

*Primary Examiner* — Ryan Stiglic
(74) *Attorney, Agent, or Firm* — Altis Law Group, Inc.

(57) ABSTRACT

An embedded system includes an ARM processor and a number of b-bit peripheral processors connected to the ARM processor through a converting chip. The ARM processor includes pins $P_0 \sim P_{a-1}$ divided into teams $T_1 \sim T_N$, each of which includes b pins, a and b are integral multiple of 8, wherein a=N×b. The number of the peripheral processors is N and each team corresponds to one peripheral processor. The converting chip reads an a-bit data from the ARM processor, converts the data into a plurality of b-bit data, and transfers each b-bit data to a peripheral processor, where the number of the b-bit data is N. The converting chip further reads one b-bit data from each peripheral processor in sequence, converts the read plurality of b-bit data into an a-bit data, and transfers the a-bit data to the ARM processor.

6 Claims, 3 Drawing Sheets

EMBEDDED SYSTEM CAPABLE OF DECREASING INTERRUPT FREQUENCY OF ARM PROCESSOR THEREOF

BACKGROUND

1. Technical Field

The present disclosure relates to embedded systems.

2. Description of Related Art

The processing ability of an Advanced Reduced Instruction Set Computer Machine (ARM) processor in an embedded system is usually high. A number of peripheral processors may be arranged around the ARM processor when the processing ability of the ARM processor can not satisfy actual needs.

Referring to FIG. 1, a traditional embedded system 1000 includes a 64-bit ARM processor 1101 with 64 pins from $P_0$-$P_{63}$, eight 8-bit peripheral processors 1201~1208, and eight 8-bit data flip-latches 1301~1308. The 64 pins are divided into eight teams $P_0$~$P_7$, $P_8$~$P_{15}$, $P_{16}$~$P_{23}$, $P_{24}$~$P_{31}$, $P_{32}$~$P_{39}$, $P_{40}$~$P_{47}$, $P_{48}$~$P_{55}$, and $P_{56}$~$P_{63}$, each of which corresponds to a peripheral processor 1201 through 1208 respectively. Each flip-latch is connected among one team of the ARM processor 1101 and a corresponding peripheral processor, to transfer data between the team and the corresponding peripheral processor. For example, the first flip-latch 1301 is connected among the team $P_0$~$P_7$ and the first peripheral processor 1201, and the eighth flip-latch 1308 is connected among the team $P_{56}$~$P_{63}$ and the eighth peripheral processor 1208. With such configuration, when one peripheral processor needs to transfer 8-bit data to the ARM processor 1101 through a corresponding data flip-latch, the ARM processor 1101 is interrupted once to read the 8-bit data, and when two or more peripheral processors need to transfer data to the ARM processor 1101 simultaneously, the ARM processor 1101 is interrupted twice or more to read data from the two or more peripheral processors respectively, which may cause the ARM processor 1101 be interrupted frequently, thus, the processing efficiency of the ARM processor 1101 correspondingly decreases.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
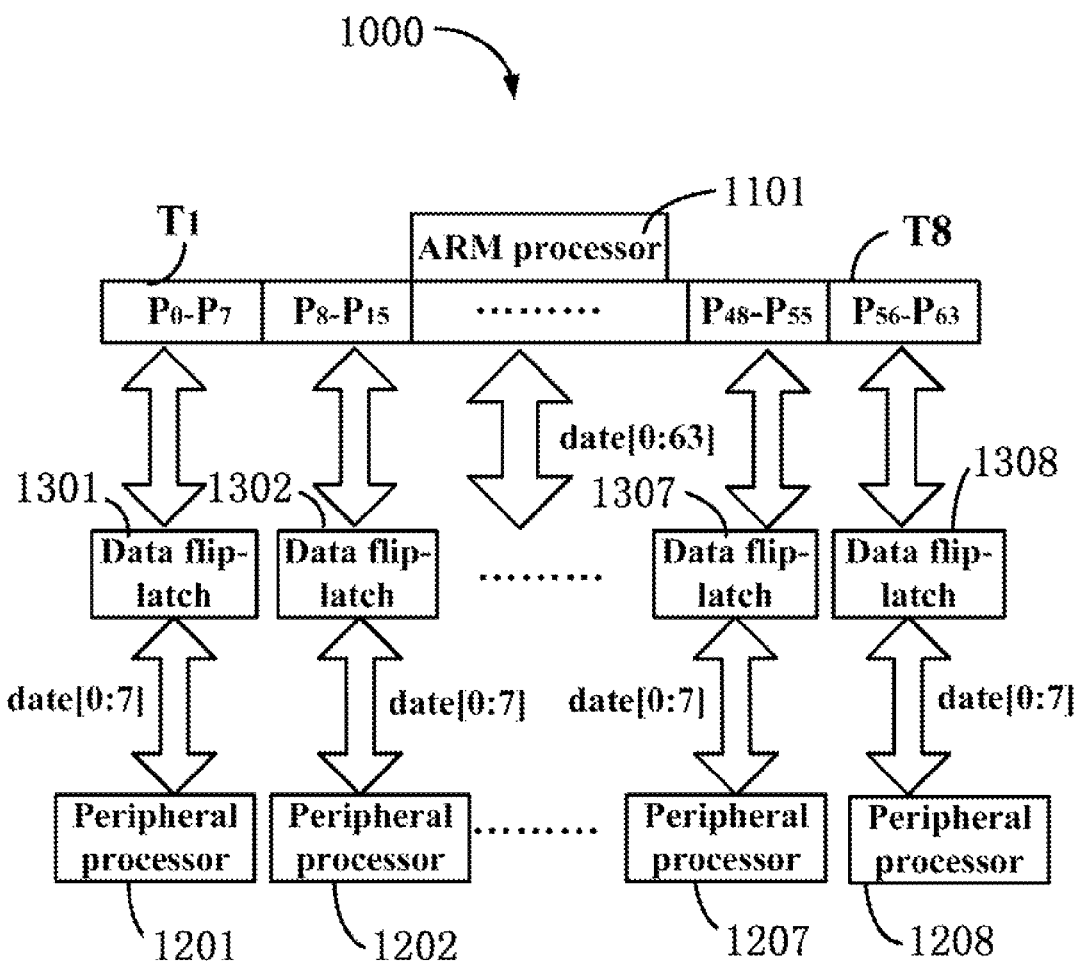
FIG. 1 is a schematic view of a traditional embedded system showing a traditional connection manner between an ARM processor and a number of peripheral processors.
Figure 2:
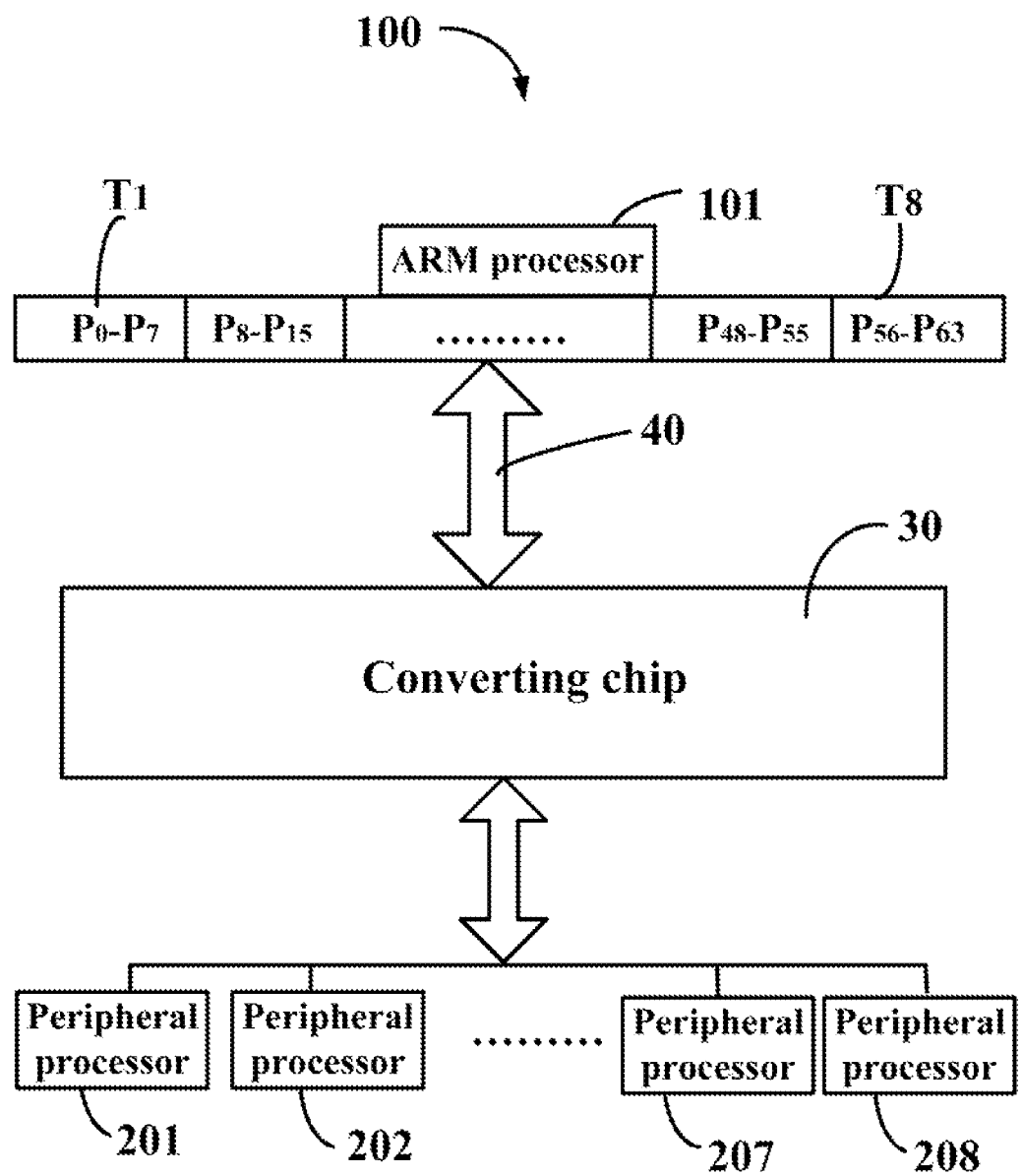
FIG. 2 is a schematic view of an embedded system showing a connection manner between an ARM processor and a number of peripheral processors in accordance with an exemplary embodiment.

Referring to FIG. 2, an embedded system 100 includes an ARM (advanced reduced instruction set computer machine) processor 101 and a number of b-bit peripheral processors 201~20N. The ARM processor 101 includes a number of pins $P_0$~$P_{a-1}$. The pins $P_0$~$P_{a-1}$ are divided into a number of teams $T_1$~$T_N$, each of which includes b pins. In this embodiment, a is an integral multiple of 8, b is an integral multiple of 8, $a = N \times b$, and N is a natural number equal to or greater than two. The number of the peripheral processors 201~20N is N, and each team corresponds to one peripheral processor. In this embodiment, a is 64, b is 8, and N is 8. In an alternative embodiment, a is 64, b is 16, and N is 4. In this embodiment, the ARM processor 101 includes 64 pins, which are divided into eight teams $P_0$~$P_7$, $P_8$~$P_{15}$, $P_{16}$~$P_{23}$, $P_{24}$~$P_{31}$, $P_{32}$~$P_{39}$, $P_{40}$~$P_{47}$, $P_{48}$~$P_{55}$, and $P_{56}$~$P_{63}$. Each of the teams $T_1$~$T_N$ corresponds to one of the peripheral processors 201 through 20N respectively. For example, the team $P_0$~$P_7$ corresponds to the first peripheral processor 201, and the team $P_{48}$~$P_{55}$ corresponds to the seventh peripheral processor 207. The team $P_0$~$P_7$ and the processor 201 exchange data with each other, and the team $P_{48}$~$P_{55}$ and the processor 207 exchange data with each other.

The embedded system 100 further includes a converting chip 30 connected among the ARM processor 101 and the peripheral processors 201-20N respectively. When an a-bit data from the ARM processor 101 needs to be transferred to the peripheral processors 201-20N, the converting chip 30 reads the a-bit data from the ARM processor 101, converts the a-bit data into a number of b-bit data, and transfers each b-bit data to a corresponding peripheral processor, where the number of the b-bit data is N. When a b-bit data from one peripheral processor needs to be transferred to the ARM processor 101, the converting chip 30 reads and stores one b-bit data from each peripheral processor in sequence. After reading the b-bit data from each peripheral processor is finished, the converting chip 30 converts the number of b-bit data into an a-bit data, and transfers the a-bit data to the ARM processor 101. With such configuration, when more than one peripheral processor needs to transfer a b-bit data to the ARM processor 101 simultaneously, the ARM processor 101 is interrupted once to read data from all the peripheral processors 201-20N in turn, thus interrupt frequency of the ARM processor 101 decreases, and the processing efficiency of the ARM processor 101 corresponding increases. In this embodiment, if one peripheral processor does not need to transfer data to the ARM processor 101, the b-bit data read from the peripheral processor is set as "00000000".

In this embodiment, the converting chip 30 is a Complex Programmable Logic Device (CPLD) chip or a Field Programmable Gate Array (FPGA) chip. The ARM processor 101 and the converting chip 30 are connected through a Serial Peripheral Interface (SPI) bus 40.

Figure 3:
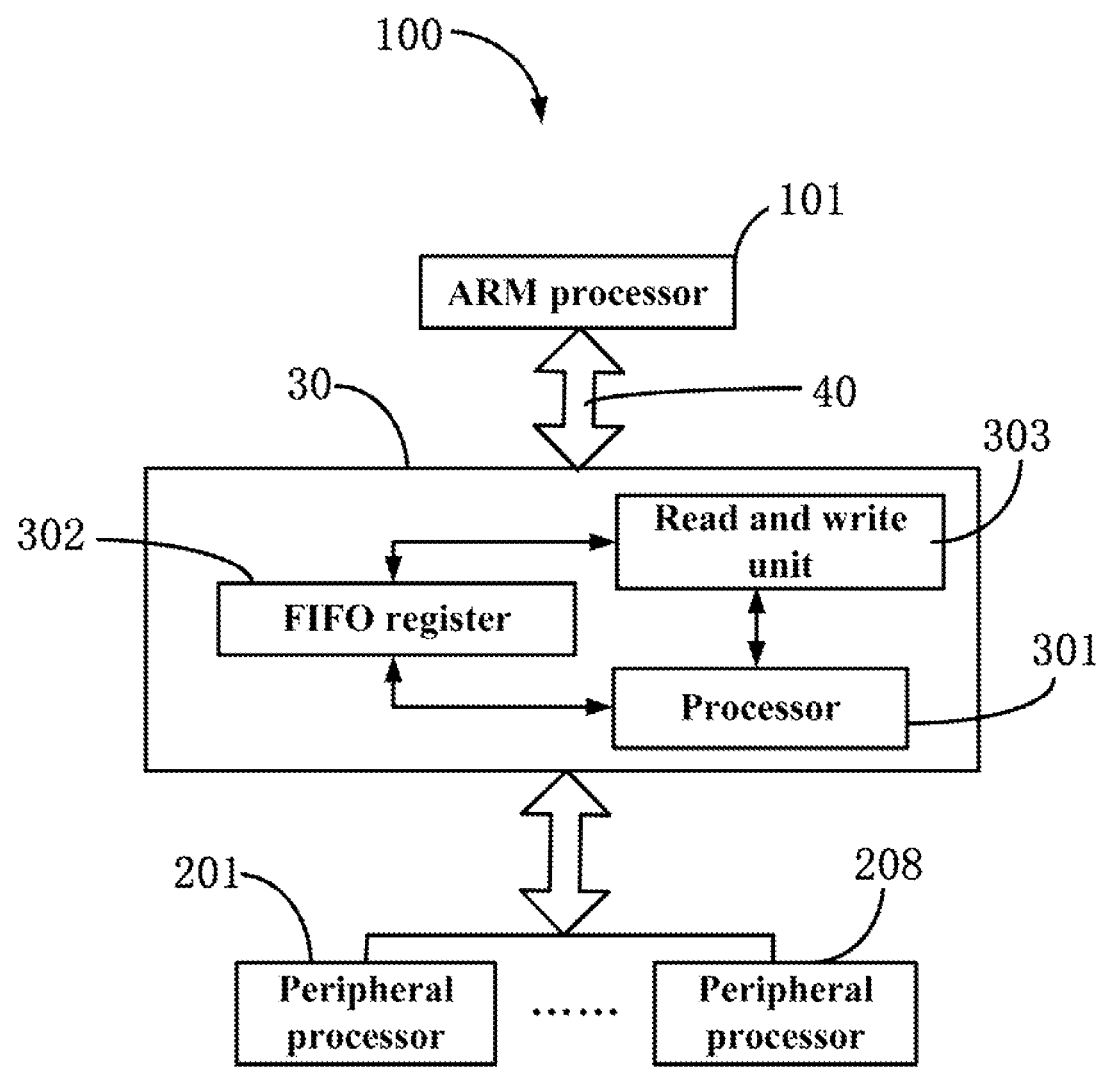
FIG. 3 is a block diagram of the embedded system of FIG. 2.

Referring to FIG. 3, the converting chip 30 includes a processor 301, a First-In First-Out (FIFO) register 302, and a read and write unit 303. The read and write unit 303 is used to read the a-bit data from the ARM processor 101, or read one b-bit data from each peripheral processor, and transfer and store the read data to the FIFO register 302. When the stored data in the FIFO register 302 is the a-bit data, the processor 301 reads the a-bit data from the FIFO register 302 according to a first in first out order, and converts the read a-bit data into a number of b-bit data, where the number of b-bit data is N. The read and write unit 303 further transfers the converted number of b-bit data to the peripheral processors 201~20N respectively. When the stored data in the FIFO register 302 is the number of b-bit data, the processor 301 reads the number of b-bit data from the FIFO register 302 according to a first in first out order, and converts the read number of b-bit data into an a-bit data. The read and write unit 303 further transfers the converted a-bit data to the ARM processor 101.

In this embodiment, the peripheral processors 201~20N are connected to the converting chip 30 through a multi-interface. When an a-bit data in the ARM processor 101 needs to be transferred to the peripheral processors 201~20N, the read and write unit 303 transfers the number of the b-bit data to the peripheral processors 201~20N in turn. In this embodiment, the read and write unit 303 transfers the first 8-bit data from the $P_0$~$P_7$ to the first peripheral processor 201 first, and transfers the second 8-bit data from the $P_8$~$P_{15}$ to the second peripheral processor 202 second. When a 8-bit data in one of the peripheral processors 201~20N needs to be transferred to the ARM processor 101, the read and write unit 303 reads a first 8-bit data from the peripheral processor 201 first, and reads a second 8-bit data from the peripheral processor 202 second.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An embedded system comprising:
an Advanced Reduced Instruction Set Computer Machine (ARM) processor comprising a plurality of pins $P_0$~$P_{a-1}$, wherein the plurality of pins $P_0$~$P_{a-1}$ are divided into a plurality of teams $T_1$~$T_N$, each of which comprises b pins, a is an integral multiple of 8, b is an integral multiple of 8, wherein a=N×b, and N is a natural number equal to or greater than two;
a plurality of b-bit peripheral processors, wherein the number of the plurality of b-bit peripheral processors is N, and each team corresponds to one b-bit peripheral processor; and
a converting chip connected among the ARM processor and the plurality of b-bit peripheral processors respectively;
wherein when an a-bit data from the ARM processor needs to be transferred to the plurality of b-bit peripheral processors, the converting chip reads and stores the a-bit data from the ARM processor, converts the a-bit data into a plurality of b-bit data, and transfers each b-bit data to a corresponding peripheral processor, where the number of the plurality of the b-bit data is N; when a b-bit data from one of the plurality of b-bit peripheral processors needs to be transferred to the ARM processor, the converting chip reads and stores one b-bit data from each peripheral processor in sequence, converts the read plurality of b-bit data into an a-bit data, and transfers the converted a-bit data to the ARM processor; when one peripheral processor does not need to transfer data to the ARM processor, the b-bit data read from the peripheral processor is set as "00000000".

2. The embedded system as described in claim 1, wherein the converting chip comprises a processor, a First-in First-out (FIFO) register, and a read and write unit, the read and write unit is to read the a-bit data from the ARM processor or read one b-bit data from each peripheral processor, and transfer and store the read data to the FIFO register, when the stored data in the FIFO register is the a-bit data, the processor reads the a-bit data from the FIFO register according to a first in first out order, and converts the read a-bit data into a plurality of b-bit data, where the number of the plurality of b-bit data is N, the read and write unit further transfers the converted plurality of b-bit data to the plurality of b-bit peripheral processors respectively; and when the stored data in the FIFO register is the plurality of b-bit data, the processor reads the plurality of b-bit data from the FIFO register according to a first in first out order, and converts the read plurality of b-bit data into an a-bit data, and the read and write unit further transfers the converted a-bit data to the ARM processor.

3. The embedded system as described in claim 2, wherein the plurality of b-bit peripheral processors is connected to the converting chip through a multi-interface, the read and write unit is configured to transfer the plurality of the b-bit data to the corresponding peripheral processors in turn when an a-bit data in the ARM processor needs to be transferred to the peripheral processors, and further configured to read one b-bit data from each peripheral processor in turn when a b-bit data from each of the plurality of b-bit peripheral processors needs to be transferred to the ARM processor.

4. The embedded system as described in claim 1, wherein the converting chip is a Complex Programmable Logic Device (CPLD) chip or a Field Programmable Gate Array (FPGA) chip.

5. The embedded system as described in claim 1, wherein the ARM processor and the converting chip are connected through a Serial Peripheral Interface (SPI) bus.

6. The embedded system as described in claim 1, wherein a is 64, b is 8, and N is 8 or a is 64, b is 16, and N is 4.

* * * * *